United States Patent [19]

Schwelling

[11] Patent Number: 4,830,295
[45] Date of Patent: May 16, 1989

[54] KNIFE ROLLER FOR PAPER SHREDDER

[76] Inventor: Hermann Schwelling, Bahnhofstrasse 115, D-7777 Salem 3/Neutrach, Fed. Rep. of Germany

[21] Appl. No.: 78,914

[22] Filed: Jul. 28, 1987

[30] Foreign Application Priority Data

Jul. 29, 1986 [DE] Fed. Rep. of Germany ....... 3625545

[51] Int. Cl.⁴ .............................................. B02C 4/30
[52] U.S. Cl. .................................... 241/293; 241/236
[58] Field of Search ............... 241/236, 235, 293, 294, 241/295; 29/121.4, 121.5

[56] References Cited

U.S. PATENT DOCUMENTS

3,860,180  1/1975  Goldhammer ................. 241/236 X
4,260,115  4/1981  Hatanaka ............................. 241/236

FOREIGN PATENT DOCUMENTS

2169222  7/1986  United Kingdom ................ 241/236

*Primary Examiner*—Mark Rosenbaum
*Attorney, Agent, or Firm*—Toren, McGeady & Associates

[57] ABSTRACT

A grooved knife roller for paper shredders. The knife roller has helically extending grooves, wherein the lagging side of each groove in the direction of rotation of the roller and the circumferential surface of the roller include an acute angle to form a hook-like sharp point facing in circumferential direction for cutting paper material in the longitudinal and transverse directions thereof. The lagging side of the groove in the direction of rotation of the roller is rectilinear and is inclined so as to be directed against the direction of rotation of the roller. A transition portion of the groove immediately adjacent the lagging side of the groove is arc-shaped.

6 Claims, 1 Drawing Sheet

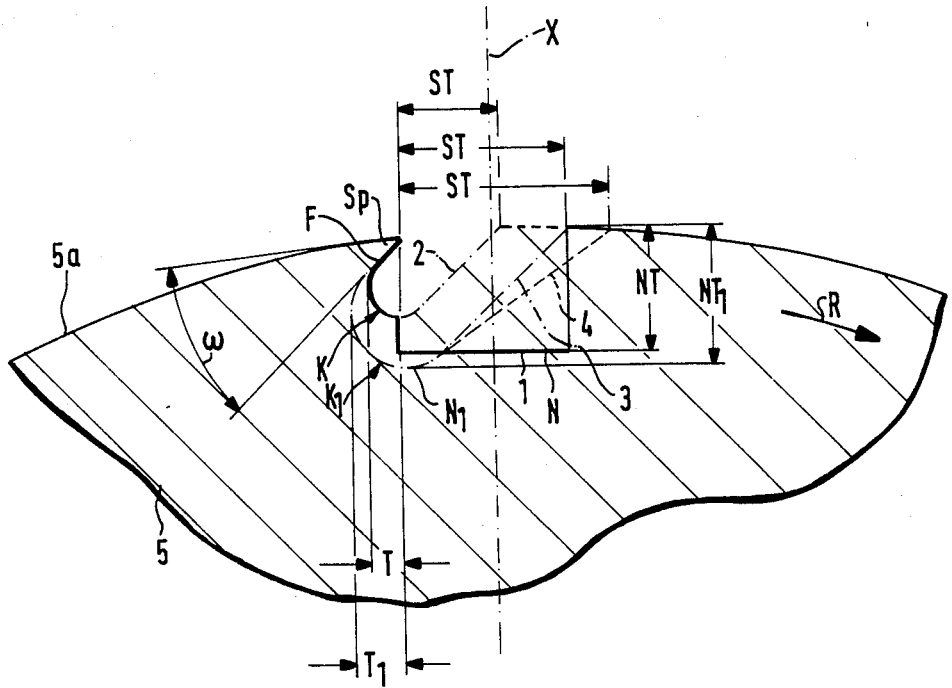

KNIFE ROLLER FOR PAPER SHREDDER

BACKGROUND OF THE INVENTION

1. Field of the Invention

The present invention relates to a grooved knife roller for paper shredders. The invention relates specifically to a knife roller having helically extending grooves, wherein the lagging side of each groove in the direction of rotation of the roller and the circumferential surface of the roller include an acute angle to form a hook-like sharp point facing in circumferential direction for cutting paper material in the longitudinal and transverse directions thereof.

2. Description of the Prior Art

Knife rollers in which the circumferential surface of the roller and a lagging side of a groove formed in the roller define an acute angle to form a sharp point are known. The grooves are formed in the surface of the rollers by means of a milling cutting process.

Knife rollers of this type have been found to operate very well in practice. However, they are very difficult and expensive to manufacture. In addition, grinding of the point which is always necessary after longer operation cannot be performed by grinding at the outer circumference of the roller because the points directed radially outwardly from the outer circumference of the roller will become dull and, thus, will lose their cutting capability.

In other known paper shredders, the circumference of a cutting wheel has very long and acute-angled teeth extending from the circumference of the wheel, so that the paper shredders of this type have the additional disadvantage that the teeth can only absorb a very small load.

It is, therefore, the primary object of the present invention to provide a knife roller for paper shredders in which the hook-like sharp point formed by the groove in the roller can be ground from the circumference of the roller without losing the sharp point, and in which an exact transverse cutting is ensured prior to the longitudinal cutting of stacks of paper having any desired thickness. In addition, it should be possible to produce the groove of such a knife roller in a single work step. Also, the sharp point of the knife roller must be capable of absorbing high loads.

SUMMARY OF THE INVENTION

In accordance with the present invention, the knife roller defines a groove whose lagging side in the direction of rotation of the roller is rectilinear and is inclined so as to be directed against the direction of rotation of the roller. A transition portion of the groove immediately adjacent the lagging side of the groove is arc-shaped.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the drawing.

BRIEF DESCRIPTION OF THE DRAWING

In the drawing:

The single FIGURE of the drawing is a partial cross-sectional view of a knife roller according to the present invention showing four different types of grooves formed in the roller.

DETAILED DESCRIPTION OF THE INVENTION

The knife roller illustrated in the FIGURE of the drawing has formed therein a groove whose one side F forms together with the outer surface 5a of the roller a sharp point Sp resulting in a cutting knife 5. Four different shapes 1 to 4 of the grooves are illustrated in the drawing. The four types of grooves 1 to 4 have the structural and functional feature in common that the side F of the groove whose beginning at the point Sp is rectilinear and is inclined so as to be directed against the direction of rotation R of the roller.

Each groove 1 to 4 illustrated in the drawing has an arc-shaped transition portion immediately adjacent the side F of the groove. This transition portion is denoted in the drawing by reference character K or K1. The transition portion extends to a bottom N or N1 of the groove and/or to the other side 2 or 3 or 4 of the groove which is inclined so as to be directed in the direction of rotation R of the roller.

The two sides of the groove F and 2 or F and 3 may extend parallel to each other or may diverge from each other.

The above-described shapes of the groove results in a strong tooth or point having a sharp edge. This tooth has a very high moment of resistance even very close to the point thereof. When the grooves begin in or near the middle of the axis, optimum cutting results are ensured in particle cutters.

In accordance with another important feature of the present invention, the depth T of the arc-shaped undercut formed by the groove 1 to 4 is about 25% greater than the thickness of the maximum thickness of the sheets to be cut. The circumferential width ST of the opening of the groove and the angle W defined by the side F of the groove and the circumference of the roller are varied in accordance with the desired particle length and efficiency of the device. Thus, excellent cutting of the paper is ensured without squeezing of the material and it is further ensured that the groove is properly emptied during operation.

In accordance with a preferred embodiment of the invention, angle W of groove 1 to 4 varies within a range of between a minimum of 30° in smaller devices and a maximum of 50° in devices having higher performance. The width ST of the groove is to be made short when short particles are desired.

The depths NT or NT1 further illustrated in the drawing are, as is conventional, about $\frac{2}{3}$ of the mutual overlapping depth of the cutting knives 5 in the region of the cutting gap.

While specific embodiments of the invention have been shown and described in detail to illustrate the application of the inventive principles, it will be understood that the invention may be embodied otherwise without departing from such principles.

I claim:

1. A knife roller for a paper shredder for cutting paper in the longitudinal and transverse directions thereof, the roller defining a helically extending groove, the groove having in cross section a first leading side in the direction of rotation of the roller and a second lagging side in the direction of rotation of the roller, the second side and the circumference of the roller including an acute angle to form a hook-like sharp point facing in circumferential direction, wherein the improvement comprises that the second side is rectilinear and is inclined relative to the circumference of the roller so as to be directed against the direction of rotation of the roller, the groove defining a transition portion immediately adjacent the second side and a bottom portion immediately adjacent the transition portion, wherein the transition portion is arc-shaped.

2. The knife roller according to claim 1, wherein the first and second sides of the grooves extend in parallel to each other.

3. The knife roller according to claim 1, wherein the first and second sides of the groove extend so as to diverge from each other.

4. The knife roller according to claim 1, wherein the transition portion defines an undercut, the depth of the undercut being about 25% greater than the thickness of a maximum thickness of paper sheets to be cut.

5. The knife roller according to claim 1, wherein the groove defines a circumferential opening between the points of intersection of the two sides of the groove with the circumference of the roller, wherein the opening and the acute angle forming the sharp point are adaptable in accordance with the desired particle length and the performance of the knife roller.

6. The knife roller according to claim 1, wherein the acute angle ranges from a minimum of 30° in smaller devices and a maximum of 50° in devices having higher performance.

* * * * *